(12) United States Patent
Nishiyama et al.

(10) Patent No.: US 11,247,532 B2
(45) Date of Patent: Feb. 15, 2022

(54) VEHICLE TEMPERATURE REGULATION APPARATUS

(71) Applicant: TOYOTA JIDOSHA KABUSHIKI KAISHA, Aichi-ken (JP)

(72) Inventors: Masahiro Nishiyama, Okazaki (JP); Kenji Tsukagishi, Toyota (JP); Takahisa Kaneko, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 92 days.

(21) Appl. No.: 15/931,593

(22) Filed: May 14, 2020

(65) Prior Publication Data
US 2020/0376926 A1 Dec. 3, 2020

(30) Foreign Application Priority Data
May 29, 2019 (JP) .............................. JP2019-100466

(51) Int. Cl.
*B60H 1/00* (2006.01)

(52) U.S. Cl.
CPC ..... *B60H 1/00878* (2013.01); *B60H 1/00271* (2013.01); *B60H 1/00807* (2013.01); *B60H 2001/003* (2013.01)

(58) Field of Classification Search
CPC ............ B60H 1/00878; B60H 1/00271; B60H 1/00807; B60H 2001/003; B60H 1/00657; B60H 1/00778; B60H 1/00985; B60H 1/00964; B60H 1/00735
See application file for complete search history.

(56) References Cited

U.S. PATENT DOCUMENTS

| | | | | |
|---|---|---|---|---|
| 4,824,013 A | * | 4/1989 | Gouldey | G05D 23/275 174/58 |
| 5,008,775 A | * | 4/1991 | Schindler | G01D 11/24 236/DIG. 19 |
| 5,484,012 A | * | 1/1996 | Hiratsuka | F04D 27/004 165/247 |
| 5,731,953 A | * | 3/1998 | Sakurai | H05K 7/20154 361/695 |
| 6,102,296 A | * | 8/2000 | Snider | B60H 1/00792 236/49.3 |
| 6,263,685 B1 | * | 7/2001 | Strobel | B60H 1/00792 236/DIG. 19 |
| 6,351,044 B1 | * | 2/2002 | Miyahara | F04D 25/0653 257/E23.099 |

(Continued)

FOREIGN PATENT DOCUMENTS

JP 200078701 A 3/2000

*Primary Examiner* — Ljiljana V. Ciric
(74) *Attorney, Agent, or Firm* — Hauptman Ham, LLP

(57) ABSTRACT

A vehicle temperature regulation apparatus includes a temperature regulator configured to regulate a temperature of a circuit board mounted in a vehicle, a controller configured to control the temperature regulator, and a storage unit configured to store a vehicle startup scheduled time. When the temperature of the circuit board at a check time before the vehicle startup scheduled time is outside of a predetermined normal temperature range, the controller executes circuit board pre-temperature-regulation control to operate the temperature regulator to regulate the temperature of the circuit board before the vehicle startup scheduled time.

5 Claims, 13 Drawing Sheets

(56) References Cited

U.S. PATENT DOCUMENTS

| | | | | |
|---|---|---|---|---|
| 8,330,385 | B2* | 12/2012 | Salter | B60K 35/00 |
| | | | | 315/287 |
| 9,371,003 | B2* | 6/2016 | Tran | B60K 31/0008 |
| 10,065,560 | B2* | 9/2018 | Fleurence | B60Q 3/80 |
| 10,589,593 | B2* | 3/2020 | Westendarp | B60H 1/00378 |
| 10,647,174 | B2* | 5/2020 | Li | B60H 1/00814 |
| 11,035,934 | B2* | 6/2021 | Schmidt | G01S 17/10 |
| 11,059,348 | B2* | 7/2021 | Yu | B60H 1/00735 |
| 2011/0198995 | A1* | 8/2011 | Salter | B60Q 3/82 |
| | | | | 315/51 |
| 2012/0253593 | A1* | 10/2012 | Tran | B60K 31/0008 |
| | | | | 701/36 |
| 2015/0073604 | A1* | 3/2015 | Ro | B60H 1/00971 |
| | | | | 700/276 |
| 2016/0207374 | A1* | 7/2016 | Gauthier | B60H 1/00778 |
| 2016/0263962 | A1* | 9/2016 | Li | B60H 1/00657 |
| 2017/0203632 | A1* | 7/2017 | Westendarp | B60H 1/00521 |
| 2017/0368905 | A1* | 12/2017 | Li | B60H 1/00778 |
| 2019/0077217 | A1* | 3/2019 | Yu | B60H 1/00735 |
| 2020/0062077 | A1* | 2/2020 | Sonnek | H04L 12/4625 |
| 2020/0189348 | A1* | 6/2020 | Jackson | B60R 11/04 |
| 2020/0198439 | A1* | 6/2020 | Yu | B60H 1/00742 |

* cited by examiner

VEHICLE TEMPERATURE REGULATION APPARATUS

CROSS REFERENCE TO RELATED APPLICATION

This application claims priority to Japanese Patent Application No. 2019-100466 filed on May 29, 2019, which is incorporated herein by reference in its entirety including the specification, claims, drawings, and abstract.

TECHNICAL FIELD

The present disclosure relates to a temperature regulation apparatus for a vehicle.

BACKGROUND

A vehicle includes a temperature regulation apparatus such as an air conditioner. JP 2000-78701 A, for example, discloses a pre-air-conditioning function to cause an air conditioner to start up before passengers of a vehicle get aboard. For example, when a vehicle is parked in the sweltering heat, the interior of the vehicle would be cooled in advance of boarding, so that the temperature of the vehicle interior is regulated to a comfortable temperature when passengers get aboard.

A vehicle further includes various circuit boards, including, for example, an engine electronic control unit (ECU), which is an ECU for controlling driving of an internal combustion engine, and an autonomous driving control unit (which is also referred to as an autonomous driving ECU).

The circuit boards may have a normal temperature range as a temperature environment in which the circuit boards are able to operate normally. If the temperature of a circuit board is outside of the normal temperature range, execution of functions performed by the circuit board would be prohibited. For example, when the temperature of the autonomous driving ECU is outside of the normal temperature range in a vehicle that is parked in sweltering heat or in cold climate areas, execution of the autonomous driving function is prohibited upon startup of the vehicle (which is referred to as "Ready-ON time").

Here, a vehicle having a pre-air-conditioning function, for example, would suffer from the following problem. As such a function is aimed at temperature regulation within the vehicle interior, a circuit board, which is disposed at a location within the vehicle but is distant from the vehicle interior, such as a location which is out of contact from the vehicle interior or vehicle exterior, may have a temperature that departs from the normal temperature range, even if the vehicle interior is at a moderate temperature.

An embodiment of the disclosure is therefore directed toward providing a vehicle temperature regulation apparatus capable of inhibiting a state in which a function performed by a circuit board for which a normal temperature range is determined is not executable upon startup of a vehicle.

SUMMARY

The present disclosure relates to a temperature regulation apparatus for a vehicle. The apparatus includes a temperature regulator that regulates the temperature of a circuit board mounted in a vehicle, a controller that controls the temperature regulator, and a storage unit that stores a vehicle startup scheduled time. When the temperature of the circuit board is outside of a predetermined normal temperature range at a check time before the vehicle startup scheduled time, the controller executes circuit board pre-temperature-regulation control to operate the temperature regulator to thereby regulate the temperature of the circuit board before the vehicle startup scheduled time.

The above structure enables execution of temperature regulation of a circuit board at the vehicle startup scheduled time, thereby inhibiting a state in which a function performed by the circuit board is not executable at the vehicle startup time.

In one embodiment of the disclosure, the circuit board may include an autonomous driving control unit that performs calculations for autonomous driving control.

The above structure inhibits a state in which the autonomous driving function is not executable at the vehicle startup time.

In an embodiment of the disclosure, the temperature regulator may be an air conditioner that regulates the temperature of a vehicle interior, in addition to the temperature of the circuit board. In this case, even when a pre-air-conditioning function of the air conditioner to regulate the temperature of the vehicle interior before the vehicle startup scheduled time is set to be off, the controller may execute circuit board pre-temperature-regulation control.

The above structure enables execution of the circuit board pre-temperature-regulation control regardless of the setting of the pre-air-conditioning function.

In accordance with another aspect, the temperature regulation apparatus for a vehicle includes a temperature regulator that regulates a temperature of a circuit board mounted in a vehicle, and a controller that controls the temperature regulator. The controller checks the temperature of the circuit board when executing pre-air-conditioning to regulate the temperature of a vehicle interior before vehicle startup, and, when the temperature of the circuit board is outside of a predetermined normal temperature range, executes circuit board pre-temperature-regulation control to operate the temperature regulator to regulate the temperature of the circuit board.

The above structure of the disclosure enables temperature regulation of the circuit board in synchronism with the pre-air-conditioning.

The disclosure may inhibit a state in which a function performed by the circuit board for which the normal temperature range is set is not executable at the vehicle startup time.

BRIEF DESCRIPTION OF DRAWINGS

Embodiment(s) of the present disclosure will be described based on the following figures, wherein.

DESCRIPTION OF EMBODIMENTS

First Example Vehicle Temperature Regulation Apparatus

Figure 1:
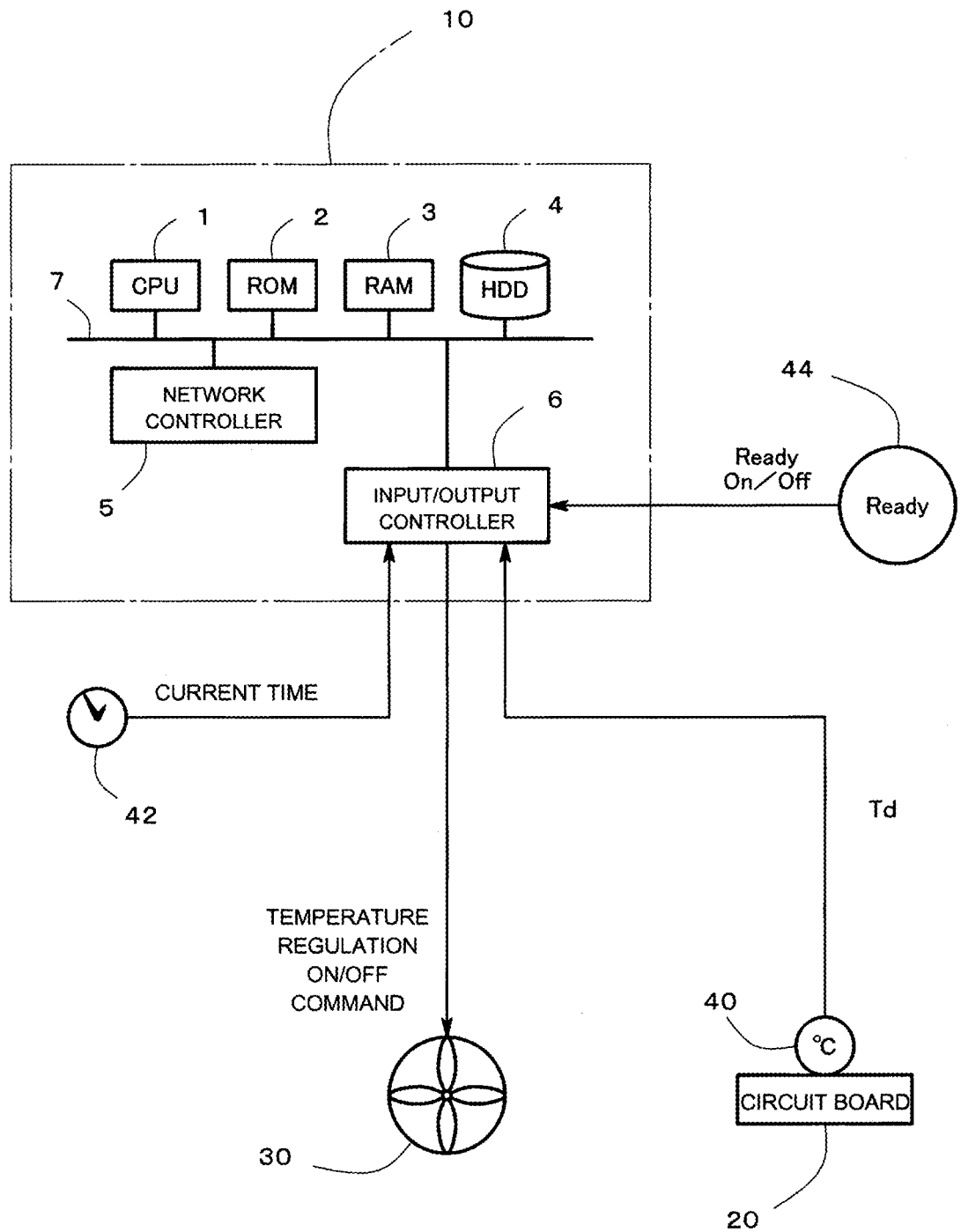
FIG. 1 is a diagram for explaining the structure of a vehicle temperature regulation apparatus according to a first example embodiment, which illustrates hardware configuration of a temperature regulation controller.
Figure 2:
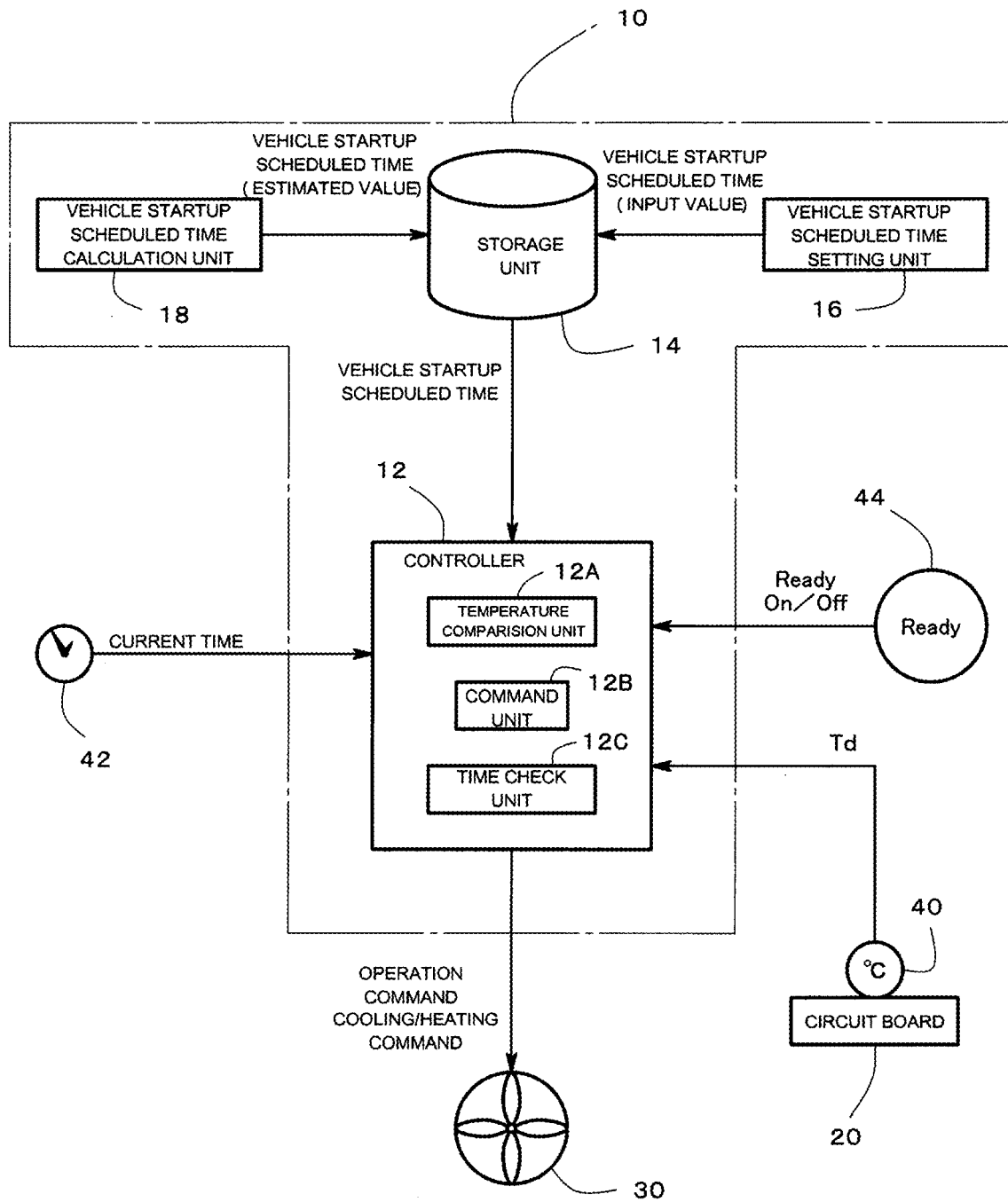
FIG. 2 is a diagram for explaining the structure of the vehicle temperature regulation apparatus according to the first example embodiment, which illustrates functional blocks of the temperature regulation controller.

FIG. 1 illustrates the configuration of a vehicle temperature regulation apparatus according to a first example embodiment. Here, FIG. 1 illustrates a hardware configuration of a temperature regulation controller 10. More specifically, FIG. 1 illustrates physical configurations of a CPU 1 and other devices forming the temperature regulation controller 10. FIG. 2 illustrates functional blocks of the temperature regulation controller 10; that is, a functional configuration of a controller and other units.

The vehicle temperature regulation apparatus according to this embodiment includes the temperature regulation controller 10, a temperature regulator 30, and a temperature sensor 40. These devices are mounted, along with a circuit board 20, in a vehicle, and are disposed near the circuit board 20, for example. As will be described below, the temperature regulator 30 regulates the temperature of the circuit board 20. The temperature regulation controller 10 includes a controller 12 (see FIG. 2) that controls the temperature regulator 30.

When the vehicle is in a ready-to-travel state (which is also referred to a "Ready-ON state"), for example, the vehicle temperature regulation apparatus regulates the temperature Td of the circuit board 20 to fall within the normal temperature range, as will be described below.

As will be further described below, even before the vehicle startup time, if the temperature Td of the circuit board 20 is outside of the normal temperature range before the vehicle startup scheduled time, the vehicle temperature regulation apparatus may perform circuit board pre-temperature-regulation to adjust the temperature Td of the circuit board 20 to be within the normal temperature range.

Here, the vehicle startup time refers to a time point at which the state of a vehicle changes from an unready-to-travel state (Ready-OFF state) in which the vehicle is not able to travel to the ready-to-travel state in which the vehicle is able to travel. For example, the vehicle startup time refers to a time point at which an operation of a power switch 44 (which is also referred to as a start switch) changes the state of the power systems of the vehicle from an OFF state or an accessary state (which are collectively included in the "Ready-OFF state") to the Ready-ON state (that is, a Ready-ON time). When the power system of the vehicle changes from the off state or the accessary state to the Ready-ON state, an indication light indicating that the vehicle is able to travel (a ready indicator lamp) is turned on.

The temperature regulation controller 10 is formed of a computer, for example. Referring to FIG. 1, the temperature regulation controller 10 includes the CPU 1, a ROM 2, a RAM 3, and a hard disk drive (HDD) 4, which are connected to an internal bus 7. The temperature regulation controller 10 further includes an input/output controller 6 that controls transmission and reception of signals with respect to an external device such as the temperature sensor 40, and a network controller 5 disposed as a communication unit. The input/output controller 6 and the network controller 5 are also connected to the internal bus 7.

Referring now to FIG. 2, the temperature regulation controller 10 includes, as its function units, the controller 12, a storage unit 14, a vehicle startup scheduled time setting unit 16, and a vehicle startup scheduled time calculation unit 18. The controller 12, the vehicle startup scheduled time setting unit 16, and the vehicle startup scheduled time calculation unit 18 are implemented by coordination of a computer forming the temperature regulation controller 10 and a program that works on the CPU 1 (see FIG. 1) mounted in the computer. The storage unit 14 is implemented by the HDD 4 mounted in the temperature regulation controller 10. Alternatively, the RAM 3 or an external storage means may be used, as the storage unit 14, via a network.

A driver or another passenger sets a vehicle startup scheduled time by an input operation in the vehicle startup scheduled time setting unit 16. The vehicle startup scheduled time refers to a next Ready-ON time (vehicle startup time); that is, a time at which the state of the vehicle is to be changed from the unready-to-travel state (Ready-OFF state) to the ready-to-travel state (Ready-ON state).

The vehicle startup scheduled time setting unit 16 displays a setting screen for the vehicle startup scheduled time at the next boarding on a center console (not shown) within the vehicle, for example. The setting screen may indicate the vehicle startup scheduled time as a boarding time. The vehicle startup scheduled time setting unit 16 further receives the vehicle startup scheduled time input from a mobile terminal of a driver or other passengers, for example.

In the case of a plug-in hybrid vehicle or an electric vehicle that is externally chargeable, the vehicle startup scheduled time setting unit 16 may operate in conjunction with the timer charging system. Specifically, the vehicle startup scheduled time setting unit 16 may obtain a charging completion scheduled time from the timer charging system and set the charging completion scheduled time as the vehicle startup scheduled time. The vehicle startup scheduled time that is thus set is stored in the storage unit 14.

The vehicle startup scheduled time calculation unit 18 calculates (estimates) the vehicle startup scheduled time using a learning function, for example. In one example, when the vehicle is parked and the power switch 44 is turned off (turned in the Ready-OFF state) on 10 pm on Wednesday, the vehicle startup scheduled time calculation unit 18 calculates the vehicle startup scheduled time on the following day, Thursday, using a learning function. In this case, the vehicle startup scheduled time is calculated based on the actual values of the vehicle startup scheduled time on the past Thursday mornings. The calculated vehicle startup scheduled time is stored in the storage unit 14.

When the vehicle startup scheduled time setting unit 16 already sets the vehicle startup scheduled time on a certain day, the vehicle startup scheduled time calculation unit 18 does need not to calculate the vehicle startup scheduled time on that day.

The controller 12 includes, as its sub units, a temperature comparison unit 12A, a command unit 12B, and a time check unit 12C. These sub units are implemented by coordination of a computer forming the temperature regulation controller 10 with a program that works on the CPU 1 (see FIG. 1) installed in the computer. As will be described below, the operation of each of the temperature comparison unit 12A, the command unit 12B, and the time check unit 12C is relevant to circuit board pre-temperature-regulation control illustrated in FIG. 5.

The temperature comparison unit 12A stores a predetermined normal temperature range determined for the circuit board 20. The normal temperature range refers to a range of temperatures within which the circuit board 20 is allowed to operate normally. The temperature comparison unit 12A stores a lower limit value Tth1 (lowest temperature) and an upper limit value Tth2 (highest temperature) of the normal temperature range.

The command unit 12B outputs an operation command and a cooling/heating command to the temperature regulator 30. As will be described below, when the temperature Td of the circuit board 20 is below the lower limit value Tth1, for example, the command unit 12B outputs a heating command to the temperature regulator 30. When the temperature Td of the circuit board 20 is above the upper limit value Tth2, the command unit 12B outputs a cooling command to the temperature regulator 30.

The command unit 12B further outputs an operation command, in addition to a cooling or heating command. The command unit 12B, for example, determines the level of temperature regulation based on a difference ΔT between the temperature Td of the circuit board 20 and the upper limit value Tth2 and the lower limit value Tth1. In cooling, for example, duty (which will be described below) to a cooling fan 32 (see FIG. 3) is determined based on the difference ΔT.

Figure 5:
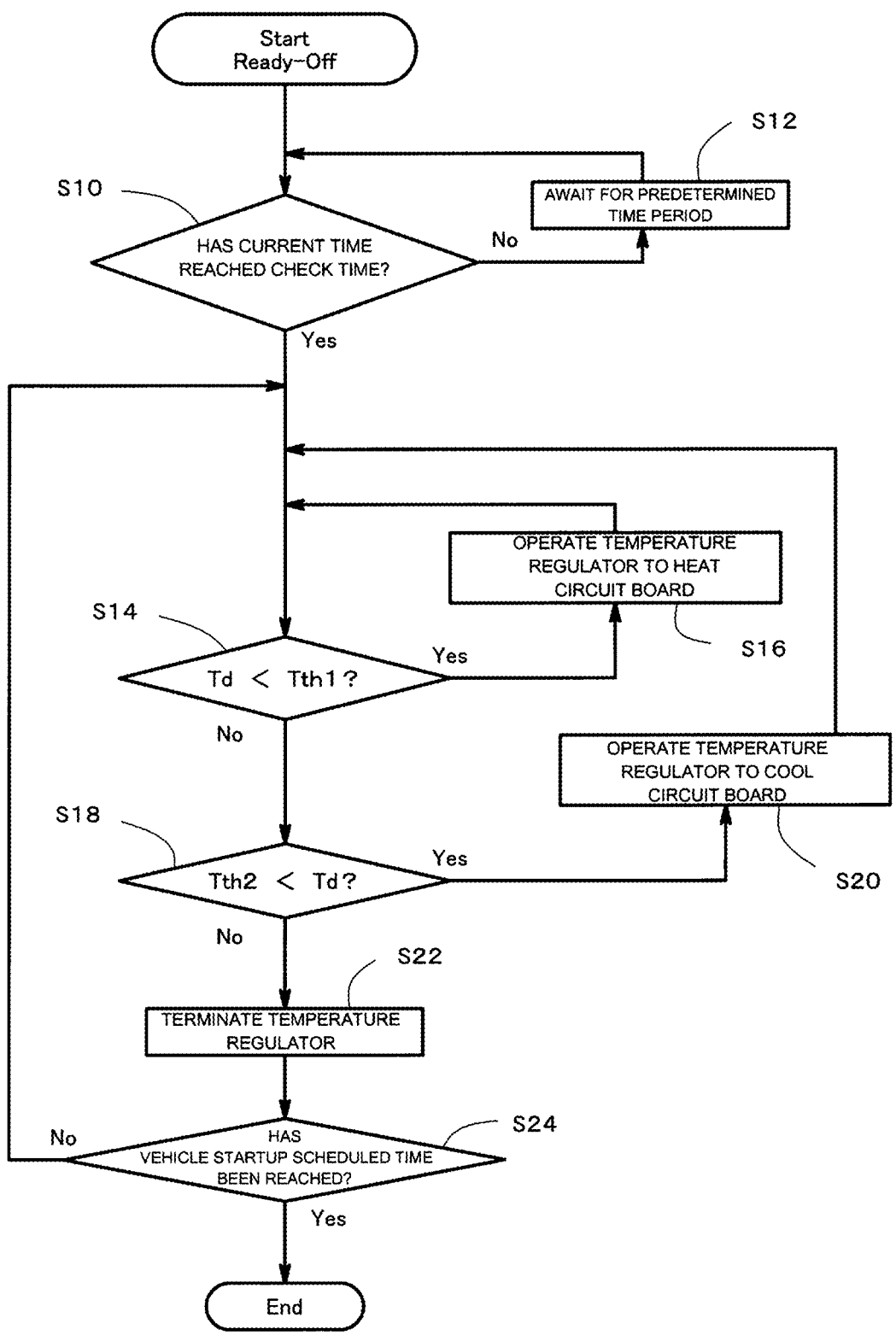
FIG. 5 is a flowchart illustrating circuit board pre-temperature-regulation control according to the first example embodiment.

The time check unit 12C compares the vehicle startup scheduled time obtained from the storage unit 14 with the current time obtained from a clock 42, and determines whether or not the circuit board pre-temperature-regulation control illustrated in FIG. 5 has been completed.

The controller 12 is capable of transmitting and receiving signals with respect to various devices. Specifically, the controller 12 may receive various signals from the storage unit 14, the temperature sensor 40, the clock 42, and the power switch 44. The controller 12 (specifically, the command unit 12B) may further transmit the operation command and the cooling or heating command to the temperature regulator 30.

The controller 12 receives (or invokes) vehicle startup scheduled time from the storage unit 14. The controller 12 further receives, from the power switch 44, a signal indicating whether the vehicle is in the ready-to-travel state (that is, Ready-ON state) or in the unready-to-travel state (that is, Ready-OFF state).

The controller 12 further acquires the current time from the clock 42. The clock 42 is an on-vehicle clock and is continuously powered by a battery of the vehicle. The controller 12 further receives the temperature Td of the circuit board 20 from the temperature sensor 40. The temperature sensor 40 may be a thermistor. The controller 12 may estimate the temperature Td of the circuit board 20 based on data of the temperature Td immediately before now and the time period elapsed from the sampling time of the data, in place of receiving the temperature Td of the circuit board 20 directly from the temperature sensor 40.

The signals obtained from the devices described above (the vehicle startup scheduled time, Ready-ON/Ready-OFF signal, current time, temperature Td) are used for circuit board pre-temperature-regulation control which will be described below. The controller 12 is capable of obtaining these signals at regular intervals based on a clock signal of a computer forming the temperature regulation controller 10.

The circuit board 20 is mounted in the vehicle, and executes various functions of the vehicle. While FIG. 2 illustrates a single symbol as the circuit board 20, a plurality of circuit boards 20 may be included. The circuit board 20 in FIG. 2 may include at least all of circuit boards including the temperature regulator 30 for regulating their own temperatures.

The circuit board 20 may be an autonomous driving controller that performs calculation for autonomous driving control, for example. In the following description, the autonomous driving controller will be referred to as an autonomous driving electronic controller (ECU).

The autonomous driving ECU analyzes an image acquired from an on-vehicle camera, which is not shown, to determine a route of the vehicle. For example, the autonomous driving ECU predicts behaviors of passersby around or vehicles travelling forward through known analysis technologies, such as detection and segmentation, and determines the route of the vehicle in accordance with the prediction result.

As the above-described processing employs artificial intelligence technologies such as deep learning, in which a great amount of image data called big data are processed, the power consumption of the autonomous driving ECU is greater than that of an engine ECU that controls the internal combustion engine, for example. As an increase in the power consumption results in an increase in the heat value of the autonomous driving ECU, a temperature regulator including a cooling function is required for the autonomous driving ECU.

Figure 3:
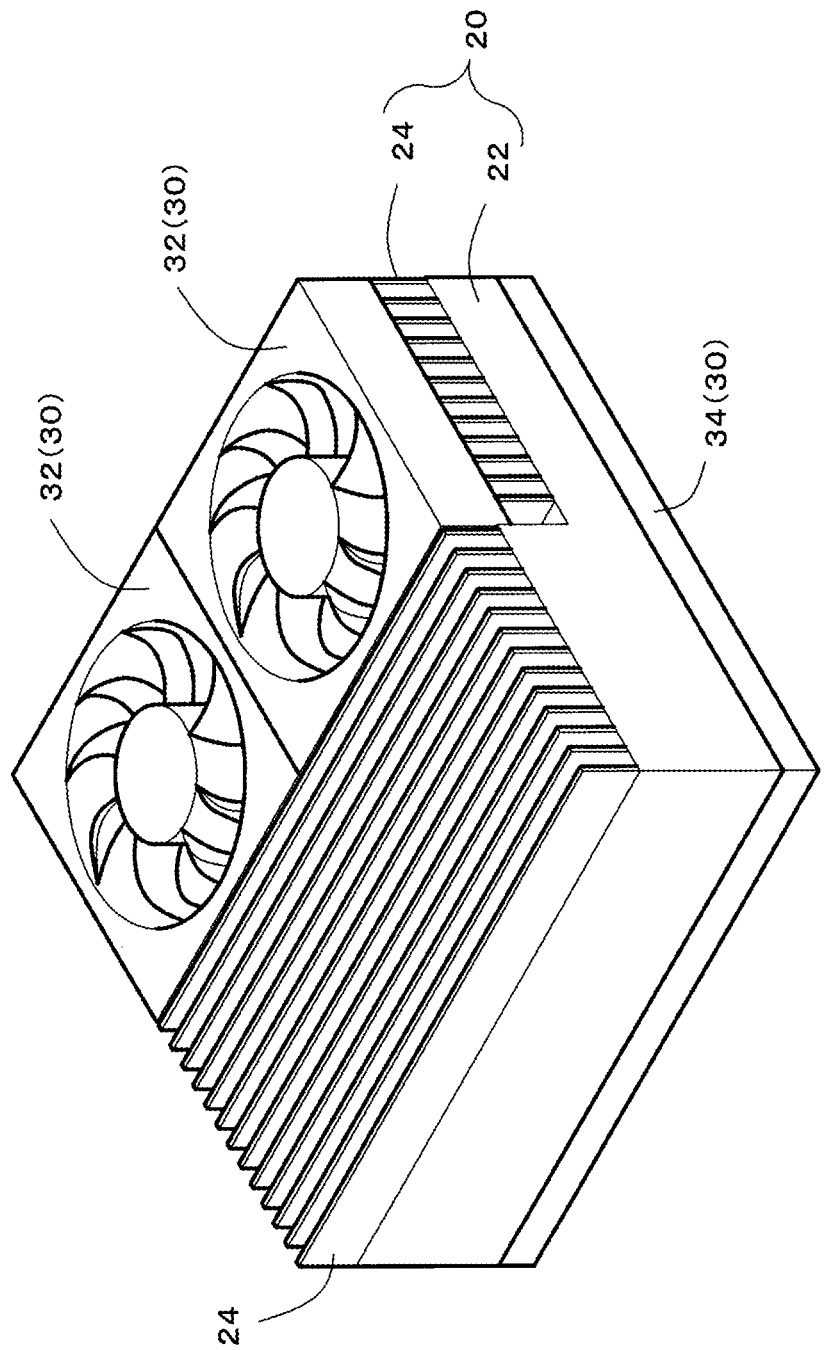
FIG. 3 is a perspective view illustrating a circuit board unit including a circuit board and a temperature regulator integrally.

For example, the circuit board 20 including the autonomous driving ECU and the temperature regulator 30 are integrated, as illustrated in FIG. 3. The circuit board 20 includes a circuit board body 22, which is the autonomous driving ECU, and a heat sink 24 mounted on the circuit board body 22.

A pair of cooling fans 32 are further disposed on the heat sink 24. Further, an electric heater 34 is disposed on a surface of the circuit board body 22 opposite a surface where the heat sink 24 is mounted. The cooling fans 32 and the electric heater 34 are included in the temperature regulator 30.

When temperature regulation of the circuit board 20 is only aimed at preventing overheating, the temperature regulator 30 may be formed of the cooling fans 32 and may omit the electric heater 34 which is a heating device. In this case, in the flowcharts illustrated in FIG. 5 and FIG. 12, which will be described below, steps S14 and S16 are omitted, and in the flowchart illustrated in FIG. 10, steps S14, S30, S32, and S16 are omitted.

Similarly, when temperature regulation of the circuit board 20 is only aimed at preventing overcooling, the temperature regulator 30 may be formed of the electric heater 34 and may omit the cooling fans 32 which are cooling devices. In this case, in the flowcharts illustrated in FIG. 5 and FIG. 12, which will be described below, steps S18 and S20 are omitted, and in the flowchart illustrated in FIG. 10, steps S18, S34, S36, and S20 are omitted.

The cooling fan 32 receives an operation command and a cooling command from the command unit 12B (see FIG. 2) when the temperature Td of the circuit board 20 exceeds the upper limit value Tth2 (highest temperature) in the normal temperature range. The rotation rate of the cooling fan 32 is controllable by duty control, for example. When a motor (not shown) for driving the cooling fan 32 to rotate is a direct-current motor, the duty control is performed based on the graph as illustrated in FIG. 4.

Under duty control, a direct current voltage to be applied to the motor is periodically turned on and off, thereby changing the duty which is a ratio of the ON time with respect to the ON/OFF period (P=ON time+OFF time). As there is a certain correlation between the rotation rate of the motor and the duty as illustrated in FIG. 4, the rotation rate of the motor; that is, the rotation rate of the cooling fan 32, can be regulated to a desirable rotation rate by regulating the duty.

Figure 4:
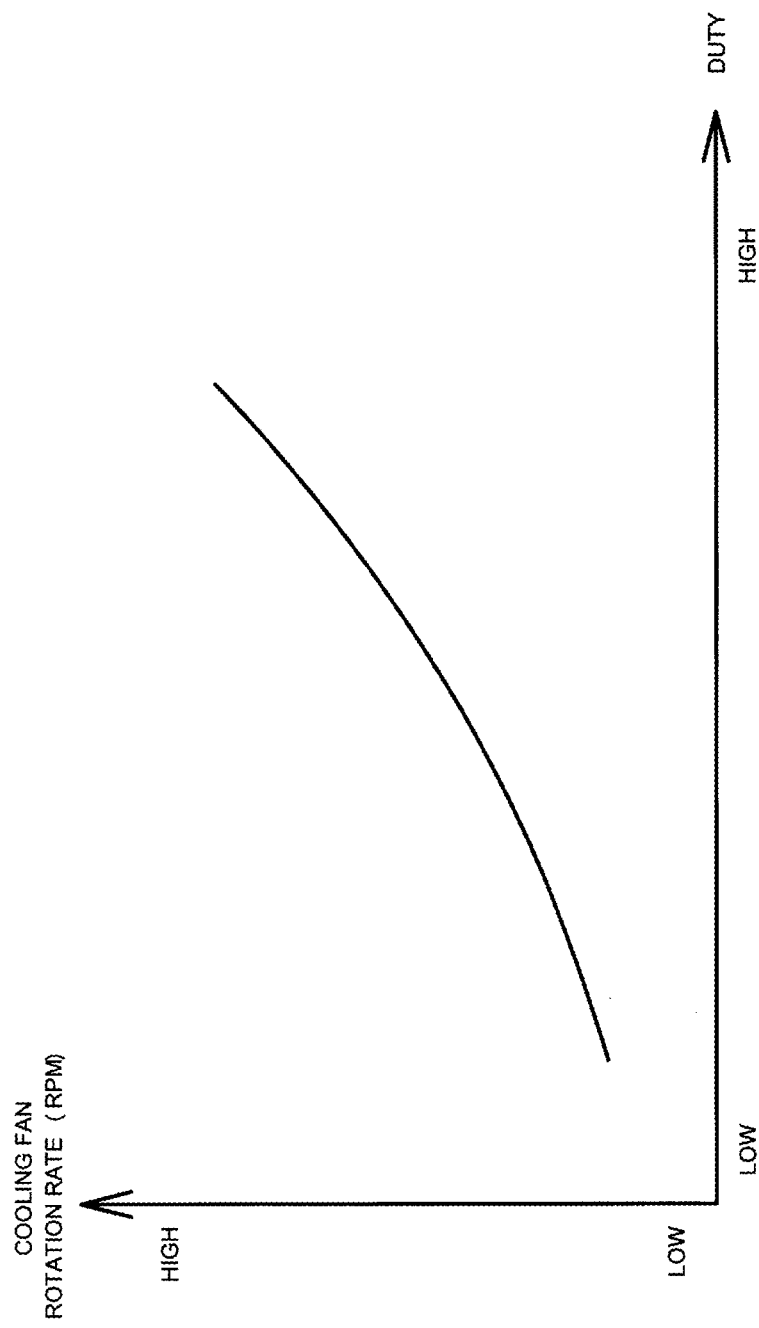
FIG. 4 is a chart for explaining driving control of a cooling fan.

The controller 12 stores a graph or map representing a relationship between the duty and the rotation rate of the cooling fan 32, as illustrated in FIG. 4. The command unit 12B (see FIG. 2) of the controller 12 outputs a command duty, which is an operation command, to the temperature regulator 30. The temperature regulator 30 includes a switching element (not shown) that turns on or off the direct current, and the switching element turns on or off the direct current to be supplied to the motor for driving the cooling fan 32, in accordance with the command duty input from the command unit 12B. The duty is determined in proportion to the difference $\Delta T$ (=Td−Tth2) between the temperature Td of the circuit board 20 and the upper limit value Tth2 of the normal temperature range, for example.

The electric heater 34 of the temperature regulator 30 receives an operation command and a heating command from the command unit 12B when the temperature Td of the circuit board 20 is below the lower limit value Tth1 (lowest temperature) of the normal temperature range. The operation command may be a command duty, for example, as in the case of the cooling fan.

While in the example illustrated in FIG. 3, the circuit board body 22 is an autonomous driving ECU, the circuit board body 22 may be any of circuit boards including the temperature regulator 30 for themselves, and may be an active sound controller ECU (hereinafter referred to as an "ASC-ECU").

The ASC-ECU issues sound that is electrically generated through a speaker within a vehicle in accordance with the rotation rate of the internal combustion engine of the vehicle and the travelling mode. This structure enables passengers including a driver to enjoy acceleration sound while conforming to noise regulations with respect to the outside.

Further, while in the example illustrated in FIG. 3, the cooling fans 32 are directly attached to the circuit board 20, a suction duct may be disposed between the circuit board 20 and the cooling fans 32. Alternatively, an exhaust duct may be disposed further downstream of the circuit board 20 with respect to the cooling fans 32.

In this case, the suction duct and the exhaust duct which are exposed outside the vehicle enable the outside air to be drawn into the cooling fans 32 and also enable the air that has passed through the circuit board 20 to be discharged outside the vehicle.

Figure 7:
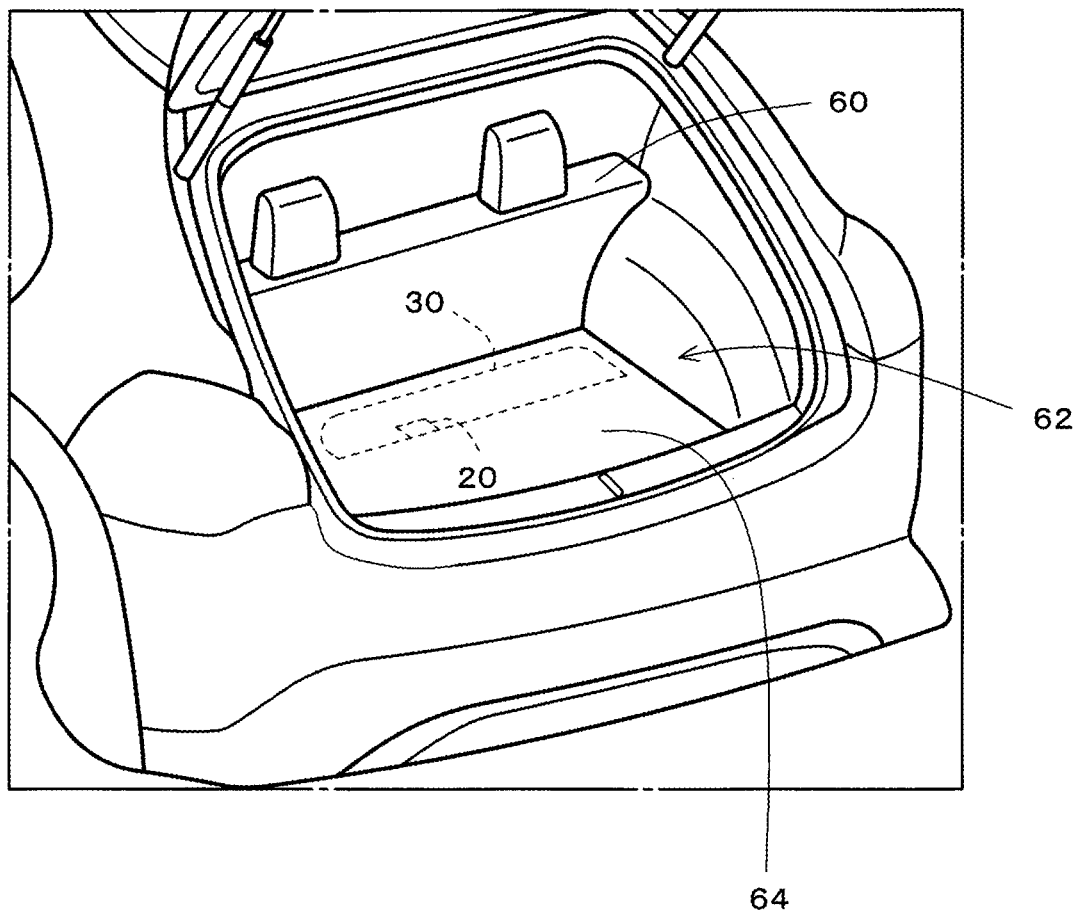
FIG. 7 is a perspective view illustrating positions of a circuit board and a temperature regulator in a vehicle interior, according to the second example embodiment.

When the circuit board 20 is disposed in a luggage space 62 as illustrated in FIG. 7, for example, the openings of the suction duct and the exhaust duct may be both exposed to the luggage space 62 to thereby cause the intake air and the exhaust air to circulate within the luggage space 62. Alternatively, the openings of the suction duct and the exhaust duct may be both exposed near the rear seat, for example, in the vehicle interior (cabin) to achieve an in-cabin circulation structure. Further, exhaustion outside the vehicle may be enabled by exposing the opening of the suction duct to the vehicle interior and exposing the opening of the exhaust duct outside the vehicle.

FIG. 5 illustrates a flowchart for circuit board pre-temperature-regulation control executed by the controller 12. This control is executed when the vehicle is in the unready-to-travel state (that is, in the Ready-OFF state), such as during parking or external charging.

The controller 12 receives, from the power switch 44, a signal indicating whether the vehicle is in the ready-to-travel state (Ready-ON state) or in the unready-to-travel state (Ready-OFF state), for example. For example, when the power switch 44 is depressed to switch from the ready-to-travel state (Ready-ON state) to the unready-to-travel state (Ready-OFF state), the circuit board pre-temperature-regulation control illustrated in FIG. 5 is to be executed.

The time check unit 12C of the controller 12 determines whether or not the current time has reached the check time (S10). The check time is a predetermined time before the vehicle startup scheduled time. For example, a time 10 minutes before the vehicle startup scheduled time is set as the check time.

If the current time has not reached the check time, the control flow turns in a temporary standby state (S12). The standby time is counted with a clock signal of a computer forming the temperature regulation controller 10, for example. After the temporary standby, the check time is confirmed once again.

If in step S10 it is determined by the time check unit 12C (see FIG. 2) that the current time has reached the check time, the temperature comparison unit 12A acquires the temperature Td of the circuit board 20 from the temperature sensor 40 and determines whether or not the temperature Td is outside of the normal temperature range. If the Td is outside of the normal temperature range, the command unit 12B causes the temperature regulator 30 to operate before the vehicle startup scheduled time to thereby regulate the temperature of the circuit board 20.

Specifically, the temperature comparison unit 12A first determines whether or not the temperature Td is below the lower limit value Tth1 of the normal temperature range (S14). If the temperature Td is below the lower limit value Tth1, the command unit 12B operates the temperature regulator 30 to heat the circuit board 20 (S16).

More specifically, the command unit 12B sends a heating command to the temperature regulator 30 to operate the electric heater 34 (see FIG. 3). In operating the electric heater 34, the command unit 12B further sends a command duty that is in proportion to a difference $\Delta T$ (=Tth1−Td) between the temperature Td and the lower limit value Tth1 to the temperature regulator 30.

The step S14 and the step S16 may be performed when the vehicle is parked in cold climate areas, for example.

After heating the circuit board 20 in step S16, the process returns to step S14, where the temperature Td of the circuit board 20 is compared to the lower limit value Tth1 of the normal temperature range. If the temperature Td is equal to or higher than the lower limit value Tth1, the temperature comparison unit 12A further determines whether or not the temperature Td is above the upper limit value Tth2 of the normal temperature range (S18).

If the temperature Td is above the upper limit value Tth2, the command unit 12B operates the temperature regulator 30 to cool the circuit board 20 (S20).

Specifically, the command unit 12B sends a cooling command to the temperature regulator 30 to operate the cooling fan 32 (see FIG. 3). In operating the cooling fan 32, the command unit 12B further sends to the temperature regulator 30 a command duty that is in proportion to a difference ΔT (=Td−Tth2) between the temperature Td and the upper limit value Tth2. After cooling the circuit board 20 in step S20, the process returns to step S14, where the temperature Td is compared to the lower limit value Tth1 of the normal temperature range.

Step S18 and step S20 described above may be performed when the vehicle is parked in sweltering heat, for example.

If the temperature Td of the circuit board 20 falls between the lower limit value Tth1 and the upper limit value Tth2 of the normal temperature range, the command unit 12B terminates the temperature regulator 30 (S22). For example, the command unit 12B turns the duty of the operation commands which have been transmitted to 0. If the temperature regulator 30 is already in a terminated state, the terminated state is maintained in step S22.

The time check unit 12C further determines whether or not the current time has reached the vehicle startup scheduled time (S24). If the current time has not reached the vehicle startup scheduled time, the control flow returns to step S14. If the current time has reached the vehicle startup scheduled time, the control flow ends.

As described above, the vehicle temperature regulation apparatus according to the embodiment executes pre-temperature-regulation with respect to the circuit board 20 before the vehicle startup scheduled time. This structure may prevent the function performed using the circuit board 20, such as autonomous driving function, from becoming unexecutable at the time of vehicle startup (at the Ready-ON time).

Second Example Vehicle Temperature Regulation Apparatus

FIG. 6 to FIG. 10 illustrate the second example vehicle temperature regulation apparatus according to a second example embodiment. Similar to the first example, the second example vehicle temperature regulation apparatus includes the temperature regulation controller 10, the temperature regulator 30, and the temperature sensor 40. While in the first example, the temperature regulator 30 is used only for temperature regulation of the circuit board 20, in the second example, the temperature regulator 30 is also used for temperature regulation within the vehicle interior, in addition to temperature regulation of the circuit board 20.

Figure 6:
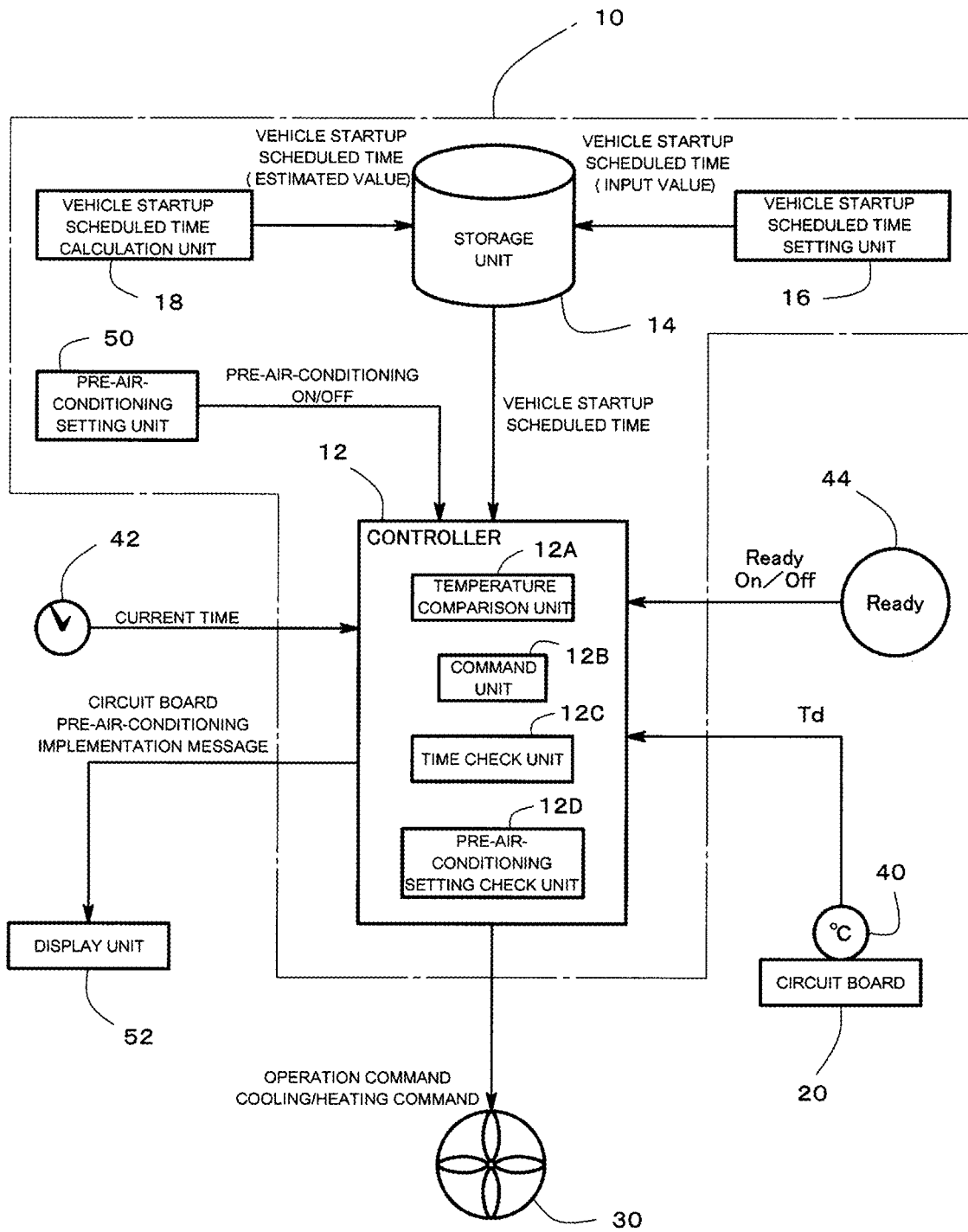
FIG. 6 is a diagram for explaining the structure of a vehicle temperature regulation apparatus according to a second example embodiment, which illustrates functional blocks of the temperature regulation controller.

FIG. 6 illustrates a second example vehicle temperature regulation apparatus. Specifically, FIG. 6 illustrates function blocks of the temperature regulation controller 10. Elements in FIG. 6 denoted by the same reference numerals as those in FIG. 2 will not be described unless the operations thereof are different from those in the first example.

The vehicle temperature regulation apparatus illustrated in FIG. 6 differs from the apparatus in FIG. 2 in that, in the vehicle temperature regulation apparatus in FIG. 6, the temperature regulation controller 10 includes a pre-air-conditioning setting unit 50. Further, the controller 12 includes a pre-air-conditioning-setting check unit 12D as its sub unit. The pre-air-conditioning setting unit 50 and the pre-air-conditioning setting check unit 12D are implemented, similar to other function blocks, by coordination of a computer forming the temperature regulation controller 10 and a program that works on the CPU1 (see FIG. 1) mounted in the computer.

The controller 12 is further capable of outputting message for executing circuit board pre-air-conditioning, which will be described below, to a display unit 52. The display unit 52 may be a meter panel, for example, or a mobile terminal, which is a smartphone, of a driver or another passenger.

The pre-air-conditioning-setting unit 50 sends to the controller 12 a signal indicating whether pre-air-conditioning setting with respect to the vehicle interior is ON (active) or OFF (stop). As will be described below, the controller 12 determines whether or not the display unit 52 displays the message for implementing circuit board pre-air-conditioning function in accordance with the pre-air-conditioning setting state.

Pre-air-conditioning setting for the vehicle interior is configured to be set off or stopped by users who prioritize costs of electricity over controlling the temperature. Meanwhile, when the autonomous driving function is prohibited at the startup of the vehicle, for example, a driver must drive him/herself or must await until prohibition of the autonomous driving function is released, which may impair convenience.

According to this embodiment, pre-temperature-regulation control for the circuit board is made executable irrespective of whether the pre-air-conditioning setting for vehicle interior is active or inactive (stop). More specifically, the circuit board pre-temperature-regulation control of this embodiment enables the controller 12 to execute the circuit board pre-temperature-regulation control even when pre-air-conditioning function (with respect to the vehicle interior) is set to stop. In addition, when such control has been executed, message indicating that pre-temperature-regulation for the circuit board has been performed is displayed for the driver and other passengers.

Figure 8:
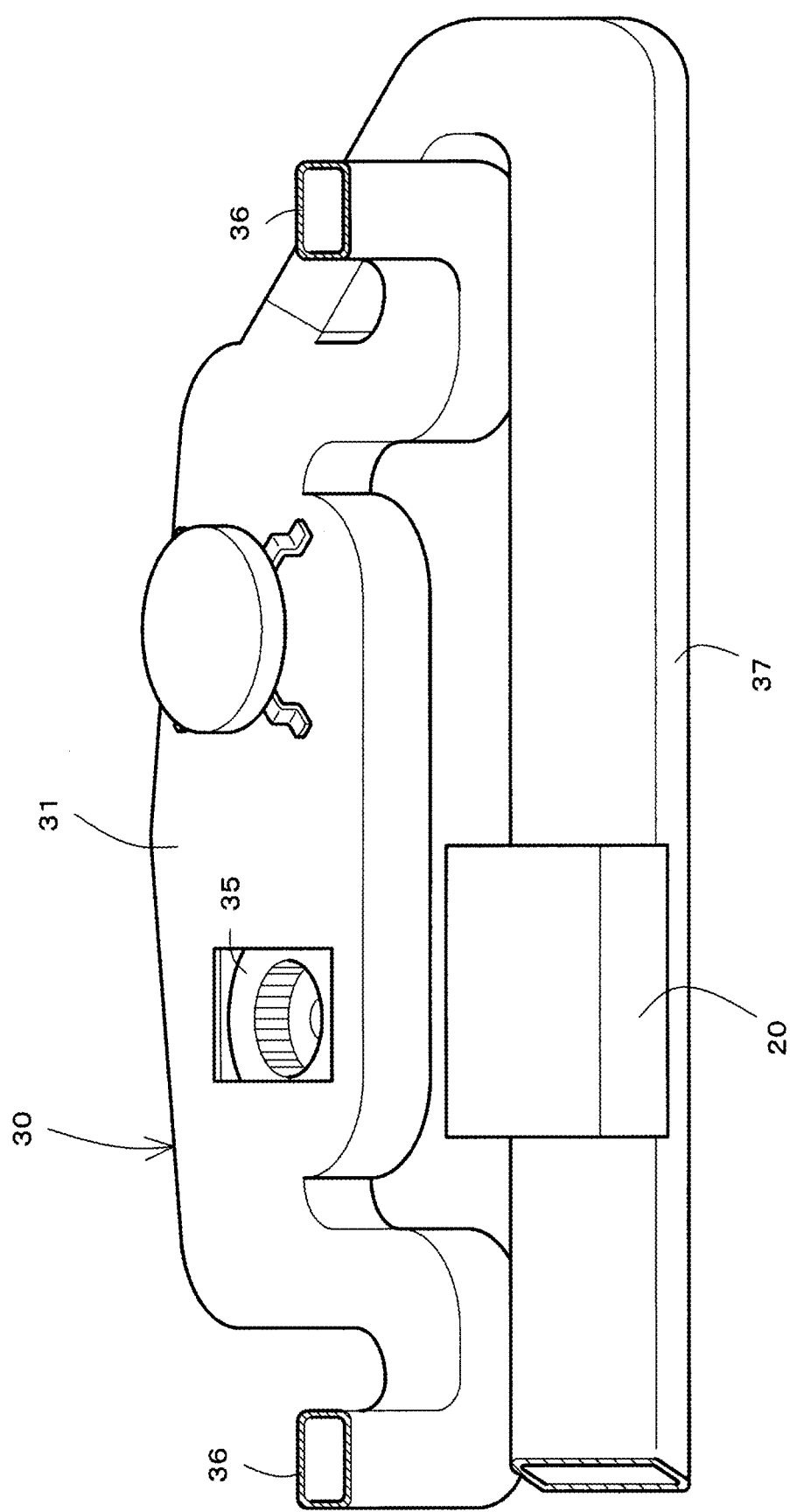
FIG. 8 is a perspective view illustrating the circuit board and the temperature regulator according to the second example embodiment.
Figure 9:
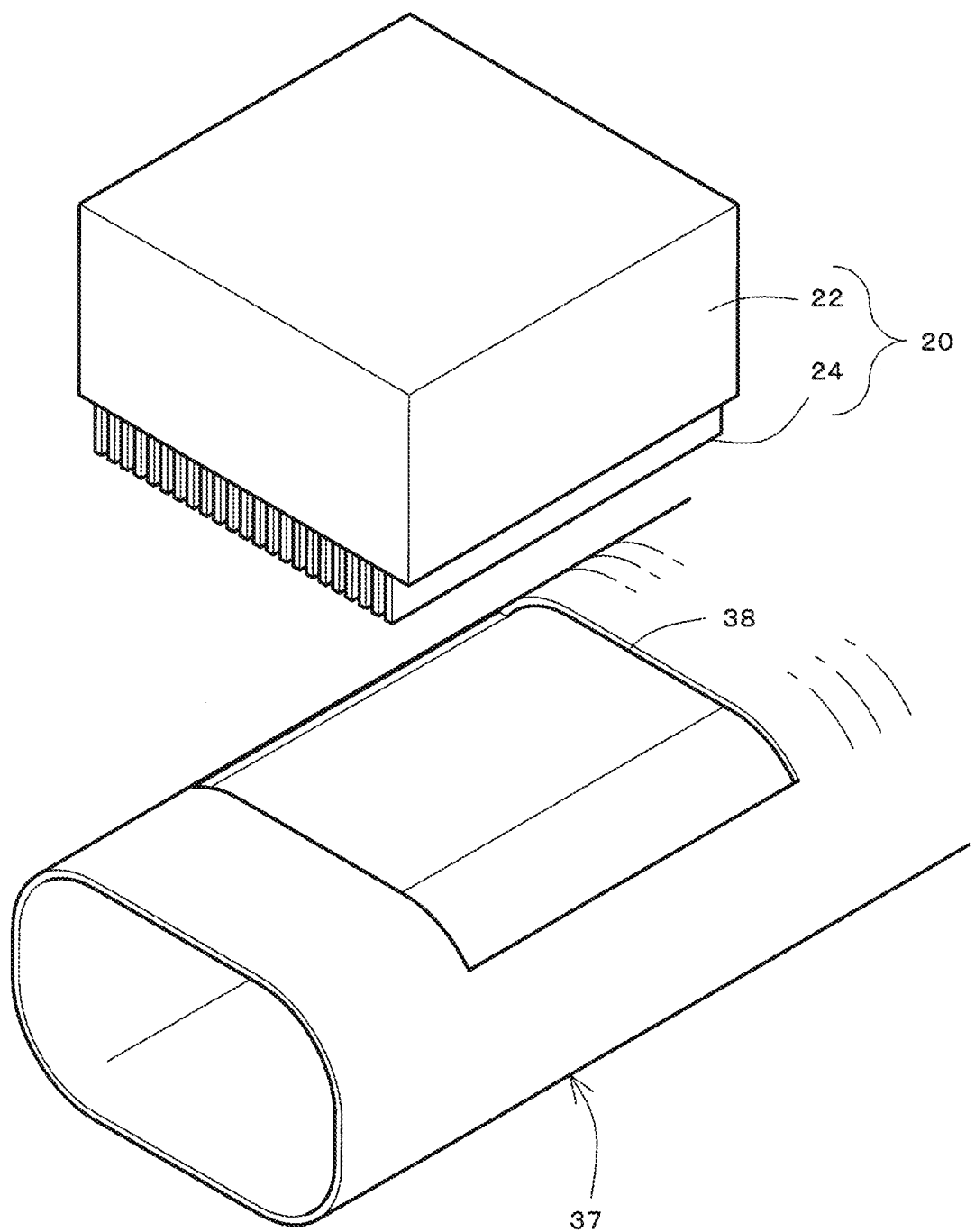
FIG. 9 is a perspective view for explaining positions of a heat sink and a duct of the circuit board.

Referring to FIG. 7 to FIG. 9, the temperature regulator 30 according to the present embodiment will be described. The temperature regulator 30 may be an air conditioner called an HVAC (heating, ventilating, and air-conditioning) unit, for example. The HVAC unit is an air conditioning function intensive unit, having an integrated function of a heater, an air blast, and an air conditioner. The temperature regulator 30 is disposed, for example, in the luggage space 62, as illustrated in FIG. 7. More specifically, the temperature regulator 30 is disposed under a luggage floor board 64 in a space toward a rear seat 60. The circuit board 20 is further attached to the temperature regulator 30. The circuit board 20 may be an autonomous driving ECU or may be an ASC-ECU described above.

FIG. 8 is a perspective view illustrating only the temperature regulator 30; that is, an HVAC unit, and the circuit board 20. The temperature regulator 30 includes a suction fan 35 and various ducts. A heater unit or an air conditioning unit is housed in a casing 31 and is not shown.

As described above, the temperature regulator 30 is an air conditioner that performs temperature regulation for the vehicle interior, such as a region around the rear seat 60, in addition to temperature regulation for the circuit board 20. The temperature regulator 30, for example, includes a pair of interior ducts 36 disposed along the width direction of the vehicle. The interior duct 36 extends to a ceiling portion at the back of the vehicle interior, where the interior duct 36 includes an opening directed toward the rear seat 60 in the ceiling portion.

The interior duct 36 is bifurcated into a circuit board duct 37, on which the circuit board 20 is disposed. A valve may be disposed at a branch point of the interior duct 36 and circuit board duct 37 so that distribution of the flow amount of air conditioning fluid between the interior duct 36 and the circuit board duct 37 is variable, or so that the vehicle interior air conditioning and temperature regulation for the circuit board 20 can be performed independently.

FIG. 9 illustrates the positional relationship between the circuit board duct 37 and the circuit board 20. The circuit board duct 37 includes an opening 38 directed toward the circuit board 20. The circuit board 20 includes the heat sink 24 directed toward the circuit board duct 37. The heat sink 24 is inserted, through the opening 38, into the circuit board duct 37 to allow the air within the circuit board duct 37 to flow into the heat sink 24, thereby allowing temperature regulation of the circuit board body 22.

Figure 10:
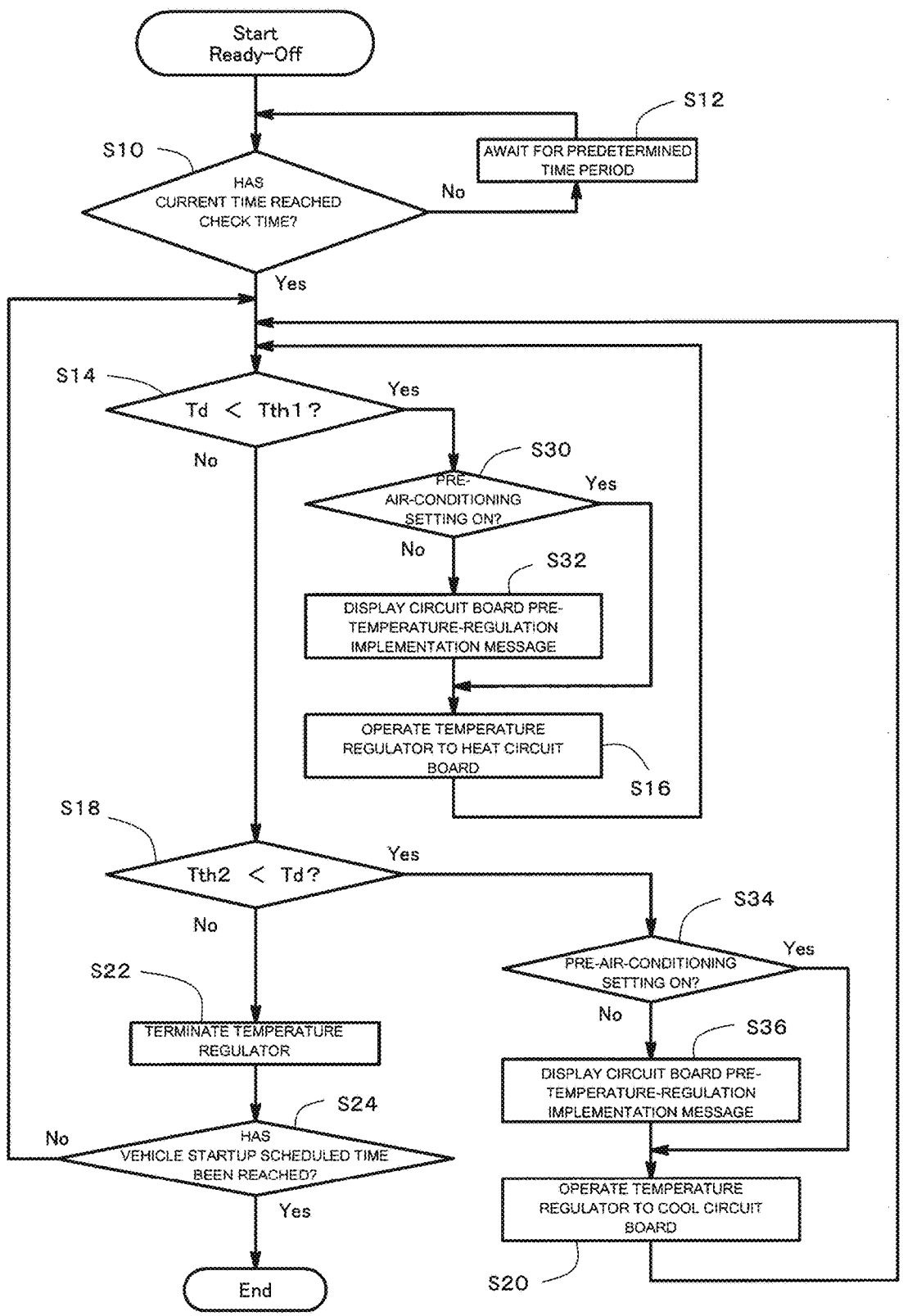
FIG. 10 is a flowchart illustrating circuit board pre-temperature-regulation control according to the second example embodiment.

FIG. 10 illustrates a flowchart for circuit board pre-temperature-regulation control performed by the second example vehicle temperature regulation apparatus. In FIG. 10, steps denoted by the same reference numerals as those in FIG. 5 include substantially the same processing as the corresponding steps in FIG. 5 and therefore will not be described.

In step S14, if the temperature Td of the circuit board 20 is below the lower limit value Tth1 of the normal temperature range, the temperature regulator 30 is operated to heat the circuit board 20. In actuating the temperature regulator 30, the pre-air-conditioning setting check unit 12D (see FIG. 6) checks the state of pre-air-conditioning setting with respect to the vehicle interior, which is set in the pre-air-conditioning-setting unit 50 (S30).

If the pre-air-conditioning setting is set to ON (active), the process proceeds to step S16, where the command unit 12B causes the temperature regulator 30 to heat the circuit board 20. If the pre-air-conditioning setting with respect to the vehicle interior is set to OFF (stop), the operation of the temperature regulator 30 is to be performed against the user's setting. The pre-air-conditioning setting check unit 12D therefore issues a message to the driver and other passengers (S32). Thereafter, the command unit 12B then operates the temperature regulator 30 to heat the circuit board 20 (S16).

More specifically, the pre-air-conditioning setting check unit 12D displays, on the display unit 52 (see FIG. 6), a message indicating that the temperature regulator 30 has been operated for circuit board pre-temperature-regulation control. The pre-air-conditioning setting check unit 12D causes, for example, the meter panel to display a message indicating that the air conditioner has been actuated to avoid termination of a predetermined function of the vehicle.

Similarly, if the temperature Td of the circuit board 20 is above the upper limit value Tth2 of the normal temperature range in step S18, the command unit 12B operates the temperature regulator 30 to cool the circuit board 20. In actuating the temperature regulator 30, the pre-air-conditioning setting check unit 12D (see FIG. 6) checks the state of setting of pre-air-conditioning with respect to the vehicle interior, which is set in the pre-air-conditioning setting unit 50 (S34).

If the pre-air-conditioning setting is set to ON (active), the process proceeds to step S20, where the command unit 12B operates the temperature regulator 30 to cool the circuit board 20. If the pre-air-conditioning setting (for the vehicle interior) is set to OFF (stop), the operation of the temperature regulator 30 is to be performed against the user's setting. The pre-air-conditioning setting check unit 12D therefore issues a message to the driver and other passengers (S32). Thereafter, the command unit 12B then operates the temperature regulator 30 to cool the circuit board 20 (S20).

As described above, in the second example embodiment, when the temperature regulator 30 is configured to execute temperature regulation for the vehicle interior in addition to temperature regulation for the circuit board 20, the vehicle temperature regulation apparatus enables pre-temperature-regulation for the circuit board irrespective of the state (ON/OFF) of pre-air-conditioning setting for vehicle interior. When the pre-air-conditioning setting for vehicle interior is off, the fact that circuit board pre-temperature-regulation control has been executed is reported to the passengers, thereby informing the passengers that execution of pre-air-conditioning is not due to an error of the pre-air-conditioning system for vehicle interior.

Third Example Vehicle Temperature Regulation Apparatus

Figure 11:
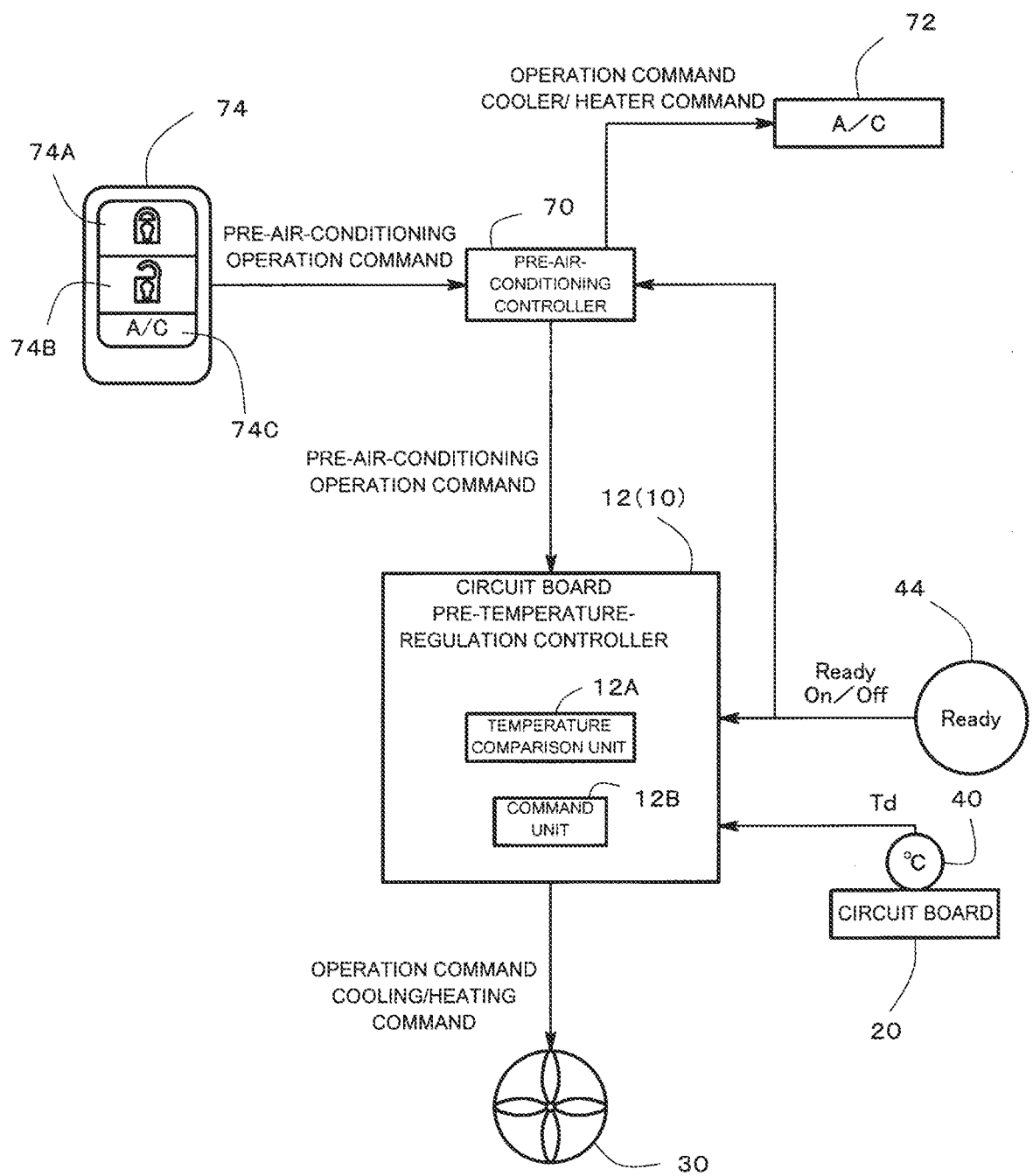
FIG. 11 is a diagram for explaining the structure of a vehicle temperature regulation apparatus according to a third example embodiment, which illustrates functional blocks of the temperature regulation controller.
Figure 12:
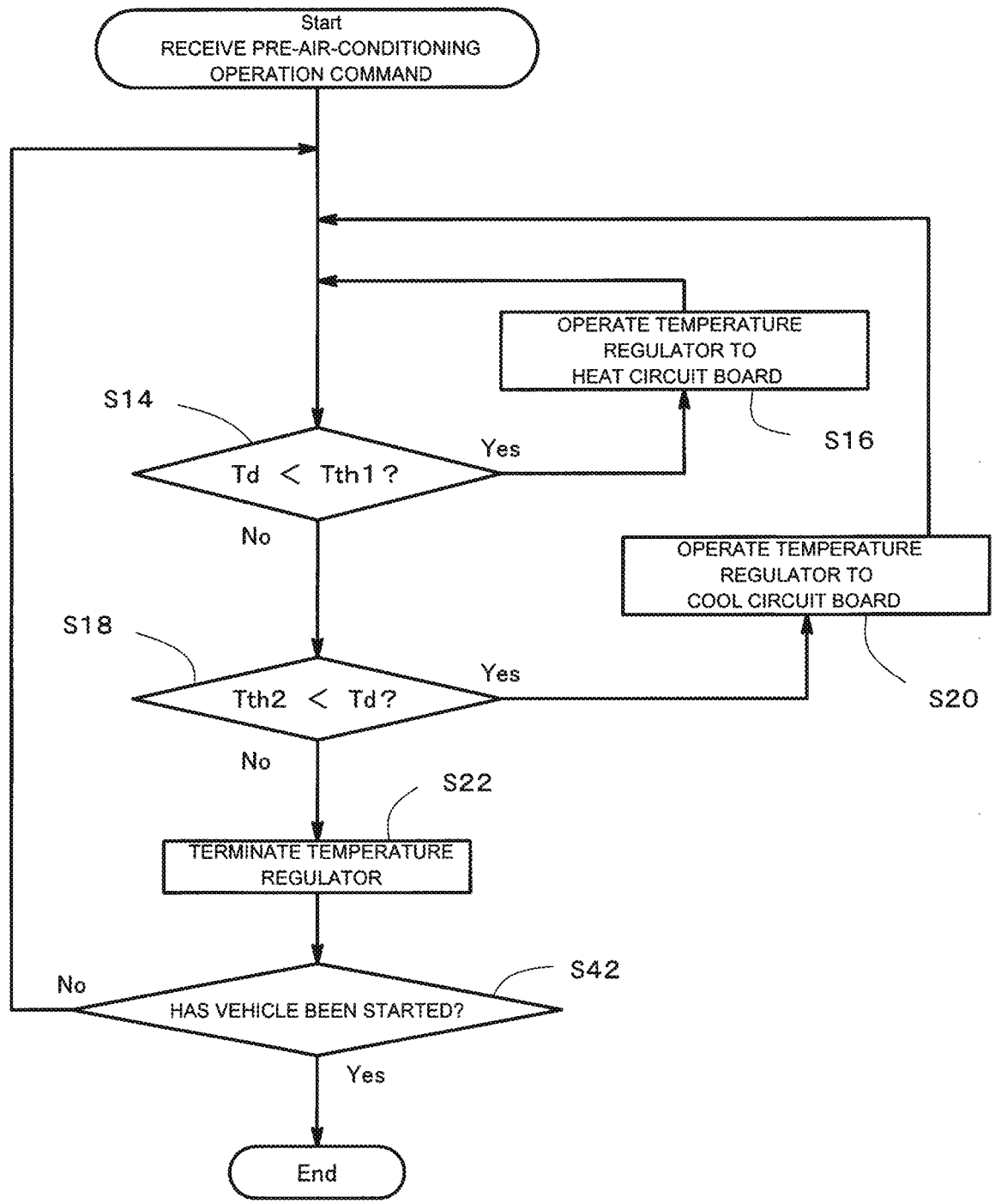
FIG. 12 is a flowchart illustrating circuit board pre-temperature-regulation control according to the third example embodiment.

FIG. 11 and FIG. 12 illustrate the third example vehicle temperature regulation apparatus according to a third example embodiment. Similar to the first example, the third example vehicle temperature regulation apparatus includes the temperature regulation controller 10, the temperature regulator 30, and the temperature sensor 40. In this example, the controller 12 of the temperature regulation controller 10 is configured to execute circuit board pre-temperature-regulation control at the time of execution of pre-air-conditioning for regulating the temperature of the vehicle interior before startup of the vehicle.

FIG. 11 illustrates the third example vehicle temperature regulation apparatus. Specifically, FIG. 11 illustrates function blocks of the controller 12 in the temperature regulation controller 10. Elements in FIG. 11 denoted by the same reference numerals as those in FIG. 2 will not be described unless the operations thereof are different from those in the first example.

Contrary to FIG. 2, FIG. 11 does not illustrate the function of setting and storing the vehicle startup scheduled time. As will be described below, the third example vehicle temperature regulation apparatus is capable of execution of circuit board pre-temperature-regulation control without the vehicle startup time being set.

The controller 12 is connected with a pre-air-conditioning controller 70 to receive an operation command for pre-air-conditioning. In the following description, the controller 12 will be referred to as a "circuit board pre-temperature-regulation controller 12" as appropriate, to clearly differentiate from the pre-air-conditioning controller 70.

The circuit board pre-temperature-regulation controller 12 includes, as its sub units, a temperature comparison unit 12A and a command unit 12B. These sub units are implemented by coordination of a computer forming the temperature regulation controller 10 with a program which operates on the CPU 1 (see FIG. 1) mounted in the computer.

The pre-air-conditioning controller 70 controls an air conditioner 72 that regulates the temperature within the vehicle interior. In particular, the pre-air-conditioning controller 70 controls the air conditioner 72 when the vehicle is in the unready-to-travel state (Ready-OFF state) before the startup of the vehicle (before the Ready-ON state).

FIG. 11 illustrates the air conditioner 72 and the temperature regulator 30 individually. For example, the air conditioner 72 may be an air conditioning system for vehicle interior air conditioning. The temperature regulator 30 may be the cooling fans 32 and the electric heater 34 dedicated to perform temperature regulation of the circuit board 20, as illustrated in FIG. 3.

Alternatively, the air conditioner 72 and the temperature regulator 30, which are illustrated individually in FIG. 11 for convenience of explanation, may be an integrated device. For example, the air conditioner 72 and the temperature regulator 30 may be an air conditioning unit that is capable of controlling the air conditioning for the vehicle interior and the temperature regulation for the circuit board 20 independently. More specifically, the HVAC unit as illustrated in FIG. 8, for example, may form the air conditioner 72 and the temperature regulator 30.

The third example vehicle temperature regulation apparatus executes circuit board pre-temperature-control that is synchronized with pre-air-conditioning performed by a remote air conditioning system that employs a smart key 74. The smart key 74 includes, in addition to a lock button 74A and an unlock button 74B, an air conditioning button 74C. When the air conditioning button 74C is depressed (kept depressed for a predetermined time) in the Ready-OFF state before startup of the vehicle, the remote air conditioning system actuates the air conditioner 72.

Specifically, when the air conditioning button 74C of the smart key 74 is depressed, the smart key 74 transmits a pre-air-conditioning operation command signal to the pre-air-conditioning controller 70. The pre-air-conditioning controller 70, after detecting continuous receipt of the pre-air-conditioning operation command signal for a predetermined time period, performs pre-air-conditioning. The pre-air-conditioning controller 70, based on a predetermined set temperature (target temperature) and the vehicle interior temperature obtained from the vehicle interior temperature sensor which is not shown, for example, determines whether to operate a cooler or a heater. The pre-air-conditioning controller 70 further sets the level of cooling and heating based on the difference between the vehicle interior temperature and the set temperature.

In executing this pre-air-conditioning, the pre-air-conditioning controller 70 transmits a pre-air-conditioning operation command to the circuit board pre-temperature-regulation controller 12. At this time, whether or not execution of circuit board pre-air-conditioning is necessary is determined. FIG. 12 illustrates a flowchart of the circuit board pre-temperature-regulation control according to the third example vehicle temperature regulation apparatus. In FIG. 12, steps denoted by the same reference numerals as those in FIG. 5 and having the substantially the same process will not be described.

The processes illustrated in the flowchart of FIG. 12, similar to those in FIGS. 5 and 10, are executable in the vehicle Ready-OFF state before the startup of the vehicle. During the Ready-OFF state, when the circuit board pre-temperature-regulation controller 12 receives a pre-air-conditioning operation command from the pre-air-conditioning controller 70, the processes illustrated in the flowchart of FIG. 12 are executed. Alternatively, the circuit board pre-temperature-regulation controller 12 may be capable of receiving the pre-air-conditioning operation command directly from the smart key 74.

From the step S14 to step S22 in the flowchart, the processes similar to those in the steps in FIG. 5 are executed. In summary, from step S14 to step S22, the circuit board pre-temperature-regulation controller 12 checks the temperature Td of the circuit board, and, if the temperature Td is outside of the normal temperature range, operates the temperature regulator 30 to regulate the temperature of the circuit board 20. If the vehicle has been started (placed in the Ready-ON state) in step S42, the process flow terminates.

As described above, the vehicle temperature regulation apparatus according to the third example embodiment is capable of pre-temperature-regulation for the circuit board 20 in synchronism with pre-air-conditioning for the vehicle interior. It is therefore possible to prevent the function performed by using the circuit board 20 from being unexecutable at the startup of the vehicle, irrespective of whether or not the vehicle startup scheduled time is set.

Other Examples of Lower Limit Value and Upper Limit Value

While in the above embodiments, one temperature value is set for each of the lower limit value and the upper limit value of the normal temperature range, such as Tth1 and Tth2, a plurality of temperature values may be set for each of the lower limit value and the upper limit value. In addition, heating and cooling setting may be changed for each temperature value.

Figure 13:
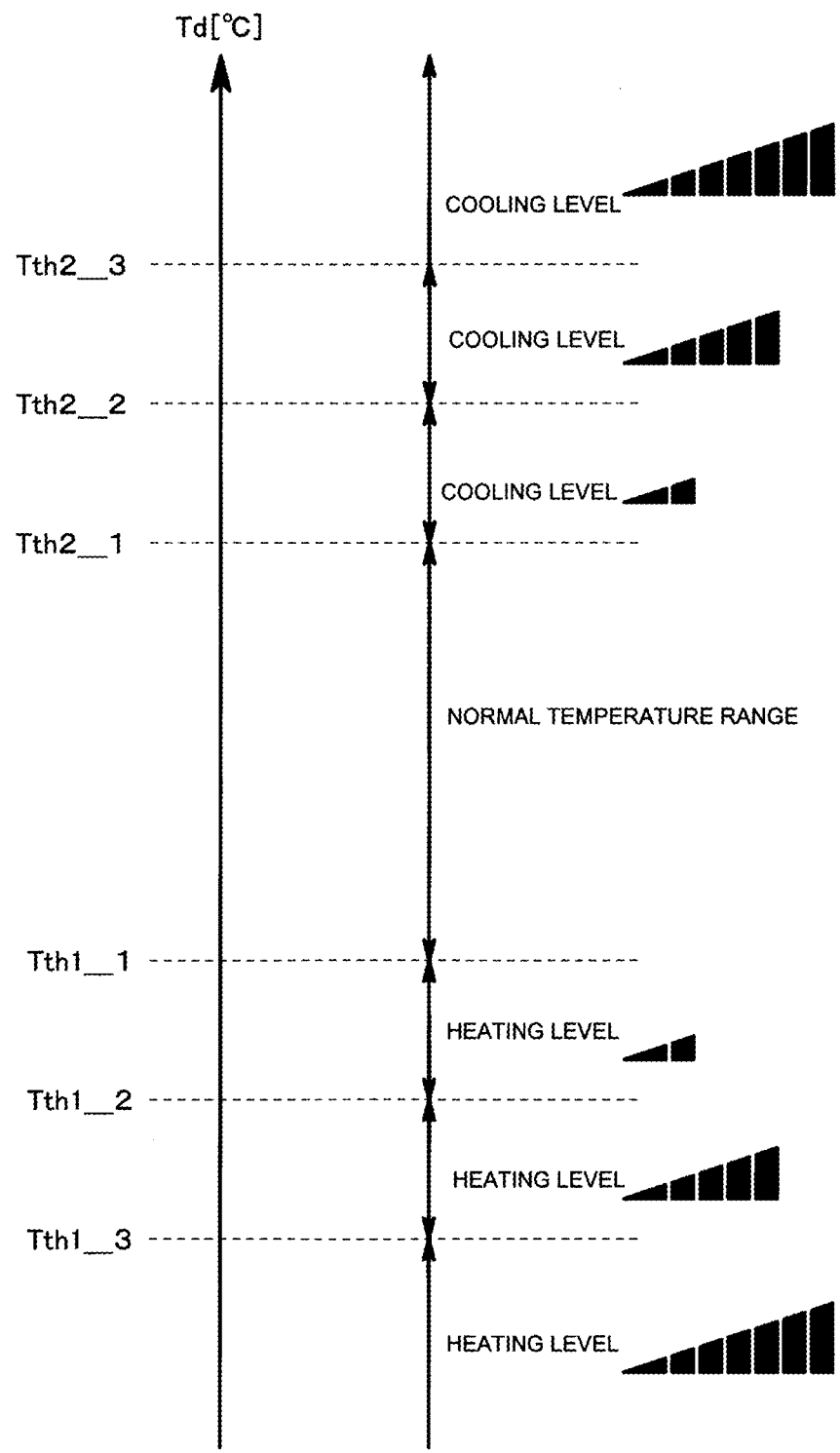
FIG. 13 is a diagram for explaining another example setting of lower limit values and upper limit values.

For example, as illustrated in FIG. 13, temperature values in three levels, Tth1_1, Tth1_2, and Tth1_3, may be set as the lower limit values, from a relatively higher temperature region toward a relatively lower temperature region.

Further, the heating level may be set for each of temperature zones sectioned by the lower limit values Tth1_1, Tth1_2, and Tth1_3. For example, as illustrated in FIG. 13, the heating level may be set to low, middle, and high for the temperature region of lower limit values of lower than Tth1_1 to Tth1_2 or higher, the temperature region of lower limit values of lower than Tth1_2 to Tth1_3 or higher, and the temperature region of lower limit values of lower than Tth1_3, respectively.

Similarly, the temperature values in three levels, Tth2_1, Tth2_2, and Tth2_3, may be set as the upper limit values, from a relatively lower temperature region toward a relatively higher temperature region. In addition, the cooling level may be set to low, middle, and high for the temperature region of upper limit values of Tth2_1 or higher to lower than Tth2_2, the temperature region of upper limit values of Tth2_2 or higher to lower than Tth2_3, and the temperature region of upper limit values of Tth2_3 or higher, respectively.

The cooling level and the heating level as described above may be set by a passenger. For example, the controller 12 may cause a center console within the vehicle or the mobile terminal of the driver or other passengers (not shown) to display the setting screen for the circuit board pre-temperature-regulation control to enable setting of the cooling level and the heating level in each temperature region.

Further, the function of the circuit board 20 may be limited in accordance with the temperature region. If the circuit board 20 is an autonomous driving ECU, the level of the available autonomous driving may be determined in accordance with the temperature region. The levels of autonomous driving are determined with reference to the driving automation levels defined by the Society of Automotive Engineers (SAE), for example.

If the temperature Td of the circuit board 20, which is an autonomous driving ECU, falls within the temperature region of the lower limit values of lower than Tth1_1 and Tth1_2 or higher or the temperature region of the upper limit value of Tth2_1 or higher and lower than Tth2_2, use of level 5 (full automation) is prohibited. If the temperature Td of the circuit board 20 falls within the temperature region of the lower limit value of lower than Tth1_2 to Tth1_3 or higher and the temperature region of the upper limit value of Tth2_2 or higher and the lower than Tth2_3, use of level 5 and level 4 (high automation) is prohibited. Further, if the temperature Td of the circuit board 20 falls within the temperature region of the lower limit value of lower than Tth1_3 and the temperature region of the upper limit value of Tth2_3 or higher, use of level 5, level 4, and level 3 (conditional automation) is prohibited.

The present disclosure is not limited to the embodiments described above, and may include all changes and modifications without departing from the technical scope or the essence of the present disclosure defined by the claims.

The invention claimed is:

1. A vehicle temperature regulation apparatus, comprising:
   a temperature regulator configured to regulate a temperature of a circuit board mounted in a vehicle;
   a controller configured to control the temperature regulator; and
   a storage unit configured to store vehicle startup scheduled time, wherein
   when the temperature of the circuit board at a check time before the vehicle startup scheduled time is outside of a predetermined normal temperature range, the controller executes circuit board pre-temperature-regulation control to operate the temperature regulator to regulate the temperature of the circuit board before the vehicle startup scheduled time.

2. The vehicle temperature regulation apparatus according to claim 1, wherein
   the circuit board includes an autonomous driving controller configured to perform calculation for autonomous driving control.

3. The vehicle temperature regulation apparatus according to claim 2, wherein
   the temperature regulator is an air conditioner configured to further regulate a temperature within a vehicle interior in addition to the temperature of the circuit board, and
   even when pre-air-conditioning function to regulate the temperature within the vehicle interior before the vehicle startup scheduled time is set to stop with respect to the air conditioner, the controller is capable of executing the circuit board pre-temperature-regulation control.

4. The vehicle temperature regulation apparatus according to claim 1, wherein
   the temperature regulator is an air conditioner configured to further regulate a temperature within a vehicle interior in addition to the temperature of the circuit board, and
   even when pre-air-conditioning function to regulate the temperature within the vehicle interior before the vehicle startup scheduled time is set to stop with respect to the air conditioner, the controller is capable of executing the circuit board pre-temperature-regulation control.

5. A vehicle temperature regulation apparatus comprising:
   a temperature regulator configured to regulate a temperature of a circuit board mounted in a vehicle; and
   a controller configured to control the temperature regulator, wherein the controller checks the temperature of the circuit board when executing pre-air-conditioning to regulate a temperature within a vehicle interior before startup of the vehicle, and, if the temperature of the circuit board is outside of a predetermined normal temperature range, the controller executes circuit board pre-temperature-regulation control to operate the temperature regulator to regulate the temperature of the circuit board.

* * * * *